United States Patent
Wenzel et al.

(10) Patent No.: US 7,193,980 B2
(45) Date of Patent: Mar. 20, 2007

(54) CONTINUATION SESSION ATTRIBUTE

(75) Inventors: Peter W. Wenzel, Plano, TX (US);
Serge Manning, Richardson, TX (US)

(73) Assignee: Nortel Networks Limited, St. Laurent (CA)

( * ) Notice: Subject to any disclaimer, the term of this patent is extended or adjusted under 35 U.S.C. 154(b) by 948 days.

(21) Appl. No.: 09/898,205

(22) Filed: Jul. 3, 2001

(65) Prior Publication Data

US 2002/0012339 A1    Jan. 31, 2002

Related U.S. Application Data

(60) Provisional application No. 60/215,747, filed on Jul. 6, 2000.

(51) Int. Cl.
*H04Q 7/00* (2006.01)
*H04Q 3/24* (2006.01)

(52) U.S. Cl. .................. 370/329; 370/338; 370/349

(58) Field of Classification Search ............. 370/328, 370/329, 331, 338, 348, 349, 389, 392, 401; 455/438, 440
See application file for complete search history.

(56) References Cited

U.S. PATENT DOCUMENTS

| | | | |
|---|---|---|---|
| 5,570,365 A * | 10/1996 | Yoshida | 370/401 |
| 6,374,108 B1 * | 4/2002 | Jakobsen et al. | 455/432.1 |
| 6,542,491 B1 * | 4/2003 | Tari et al. | 370/338 |
| 6,628,671 B1 * | 9/2003 | Dynarski et al. | 370/469 |
| 6,647,264 B1 * | 11/2003 | Sasamoto | 455/445 |
| 6,654,359 B1 * | 11/2003 | La Porta et al. | 370/328 |
| 6,768,726 B2 * | 7/2004 | Dorenbosch et al. | 370/331 |
| 6,801,509 B1 * | 10/2004 | Chuah et al. | 370/328 |
| 6,842,462 B1 * | 1/2005 | Ramjee et al. | 370/466 |

OTHER PUBLICATIONS

TR 45: Wireless IP Network Standard; TIA/EIA/I5-835 (Jun. 2000).
Livingston, C. et al.; "RFC 2138: Remote Authentication Dial In User Service (RADIUS)" Network Working Group (Apr. 1997).
Livingston, C.; "RFC 2139: RADIUS Accounting"; Network Working Group (Apr. 1997).
Postel, J.; "User Datagram Protocol"; (Aug. 28, 1980).

* cited by examiner

*Primary Examiner*—Doris H. To
*Assistant Examiner*—Ian N. Moore
(74) *Attorney, Agent, or Firm*—Hemingway & Hansen, LLP; D. Scott Hemingway; Malcolm W. Pipes

(57) ABSTRACT

A new message format and protocol in an IP mobility system. Deallocation of a mobile node's IP address during a multipart communication session on a foreign network can cause serious communication and accounting errors. The new message format and protocol should eliminate the premature deallocation of a mobile node's IP address, which should reduce associated communication and accounting errors.

23 Claims, 3 Drawing Sheets

CONTINUATION SESSION ATTRIBUTE

PRIOR APPLICATION DATA

This application is related to Provisional Application No. 60/215,747 filed Jul. 6, 2000.

TECHNICAL FIELD OF THE INVENTION

A message format and communication protocol for an IP mobility system.

BACKGROUND OF THE INVENTION

Present-day Internet communications represent the synthesis of technical developments begun in the 1960s. During that time period, the Defense Department developed a communication system to support communications between different United States military computer networks, and later a similar system was used to support the communication between research computer networks at United States universities. These technological developments would subsequently revolutionize the world by forming the basic elements of the Internet.

The Internet

The Internet, like so many other high tech developments, grew from research originally performed by the United States Department of Defense. In the 1960s, Defense Department officials wanted to connect different types of military computer networks. These different computer networks could not communicate with each other because they used different types of operating systems or networking protocols.

While the Defense Department officials wanted a system that would permit communication between these different computer networks, they realized that a centralized interface system would be vulnerable to missile attacks and sabotage. To avoid this vulnerability, the Defense Department required that the interface system be decentralized with no vulnerable failure points.

The Defense Department developed an interface protocol for communication between these different network computers. A few years later, the National Science Foundation (NSF) wanted to connect different types of network computers located at research institutions across the country. The NSF adopted the Defense Department's interface protocol for communication between these research computer networks. Ultimately, this combination of research computer networks would form the foundation for today's Internet.

Internet Protocols

The Defense Department's interface protocol was called the Internet Protocol (IP) standard. The IP standard now supports communications between computers and networks on the Internet. The IP standard identifies the types of services to be provided to users, and specifies the mechanisms needed to support these services. The IP standard also describes the upper and lower system interfaces, defines the services to be provided on these interfaces, and outlines the execution environment for services needed in the system.

One basic rule governing communications on the Internet is the requirement that a computer user does not need to get involved with details of each communication. In order to accomplish this goal, the IP standard imposes a layered communications structure. All the layers are located on each computer in the network, and each module or layer is a separate component that theoretically functions independent of the other layers.

Two types of transmission protocols may operate with the IP protocol—the Transmission Control Protocol (TCP) or the User Datagram protocol (UDP). TCP was developed to provide connection-oriented, end-to-end data transmission between packet-switched computer networks, and UDP supports a connection-less transmission between computer networks. Unlike UDP, TCP provides certain error recovery and data-checking services. The combination of TCP or UDP with the IP protocol forms a suite of protocols for communication between computers on the Internet.

This suite of protocols form a standardized system for defining how data should be processed, transmitted and received on the Internet. These protocols also define the network communication process, and more importantly, defines how a unit of data should look and what information an information packet message should contain so that the receiving computer can receive the information message and interpret it properly.

Routing

Routers are used to regulate the flow of data through a computer network. A router interprets the logical address of an information packet, such as an IP address, and directs the information packet to its intended destination. Information packets addressed between computers on the same network are not allowed to pass outside the network, while information packets addressed to a computer outside the network are allowed to pass to that computer on the outside network.

A routing table possesses sufficient information for a router to make a determination on whether to accept the communicated information packet on behalf of a destination computer or pass the information packet onto another router on the network. The routing table also permits the router to determine where the information should be forwarded within the network. A Visitor Location Register (VLR) and Home Location Register (HLR) are two examples of such routers. A routing table can be configured manually with routing table entries or dynamically according to changing network topologies—network architecture, network structure, layout of routers, and interconnections between hosts and routers.

Authenticate, Authorize and Accounting ("AAA")

In an IP-based mobile communications system, the mobile communication device (e.g. cellular phone, pager, etc.) can be generically called a mobile node. Typically, a mobile node changes its point of attachment to the network while maintaining connectivity to its home network. That is, a home network continues to transmit information packets to the mobile node even when the mobile node is located on another network, sometimes referred to as a foreign network. While the mobile node is coupled to the foreign network, the mobile node will be assigned an IP address for the transmission of information packets.

When a mobile node is operating on a foreign network, specialized servers must authenticate, authorize and collect accounting information for services rendered to the mobile node. This authentication, authorization, and accounting activity is called "AAA", and AAA servers on the home and foreign network perform the AAA activities.

Authentication is the process of proving someone's claimed identity, and security systems on a mobile IP network will often require authentication of the system user's identity before authorizing a requested activity. The AAA server authenticates the identity of an authorized user, and authorizes the mobile node's requested activity. Additionally, the AAA server will also provide the accounting function including tracking usage and charges for use of the network.

A mobile node is assigned an IP address while it conducts a communication session on the foreign network. When a mobile node roams through a foreign network, the wireless connection of the mobile node to the foreign network may transition from one base station (or packet control function) to another. When the transition of the wireless connection occurs, certain prior art protocols send accounting messages to the AAA server that initiate the deallocation of the mobile node's IP address. This deallocation of the IP address may be unintentional because the mobile node intends to continue its communication session while it roams the network. When the deallocation of the IP address occurs, information packets addressed to the mobile node may be misdirected or lost. Other problems, such as billing and accounting difficulties, may be encountered after a premature deallocation of the IP address.

SUMMARY OF THE INVENTION

When a mobile node's wireless connection transitions from one base station (or packet control function) to another, the mobile node may want to maintain its connectivity to the network. This continued network connection allows the mobile node to continue to transmit and receive information packets in a multipart session. In order to prevent the premature deallocation of the mobile node's IP address in a multipart session, the present invention supports the use of a new message format and protocol for extending the time prior to a deallocation of the IP address. The new message format includes the addition of an attribute to an accounting message that will cause the AAA server to recognize the mobile node's desire to maintain connectivity to the network in a multipart session. In response to the new message format attribute, a AAA server will not deallocate the IP address for the mobile node, and the same IP address can be used for the mobile node after the transition of a wireless connection.

BRIEF DESCRIPTION OF THE DRAWINGS

The objects and features of the invention will become more readily understood from the following detailed description and appended claims when read in conjunction with the accompanying drawings in which like numerals represent like elements and in which:

DETAILED DESCRIPTION OF THE PREFERRED EMBODIMENTS

Figure 1:
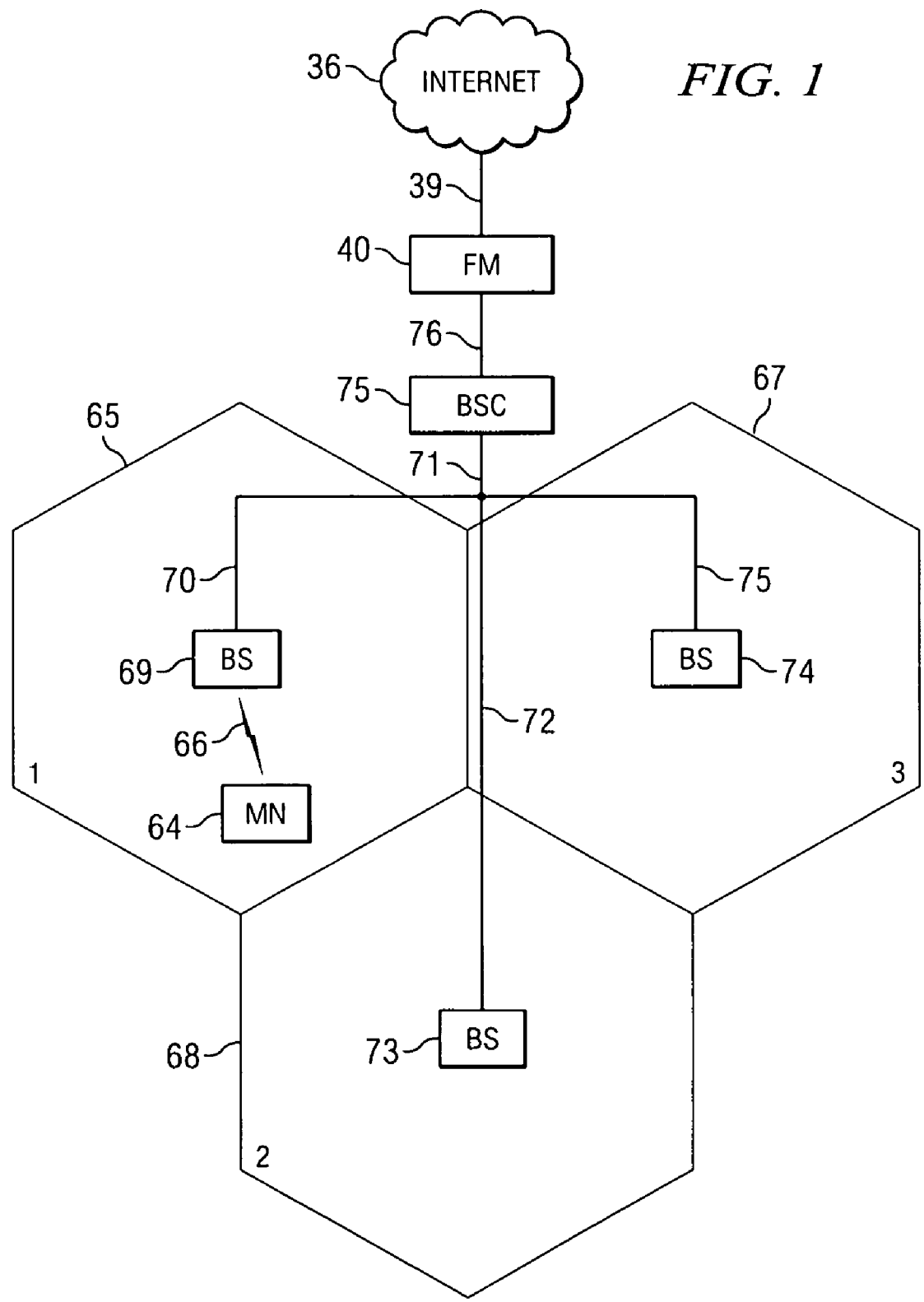
FIG. 1 is a schematic diagram of cellular sites on a mobile IP wireless communications network.

In FIG. 1, cellular site 65 is shown in a mobile IP network. In cellular site 65, mobile node 64 is coupled to base station 69 via wireless connection 66. The base station 69 is coupled to the base station controller 75 via connections 70 and 71. Cellular site 68 has a base station 73 to support wireless connections in that cellular site. Base station 73 is coupled to the base station controller 75 via connections 72 and 71. Cellular site 67 has a base station 74 to support wireless connections in that cellular site. Base station 74 is coupled to the base station controller 75 via connections 75 and 71.

The base station controller 75 is coupled to a foreign network 40 via communication line 76. The foreign network 40 is coupled to the Internet 36 via communication line 39. The terms base station or base station controller can be referred to as a base station transceiver, packet control function or base station subsystem. The term foreign network can be referred to as visited network.

When operating within cellular site 65, the mobile node 64 communicates through a wireless connection 66 to base station 69. The mobile node communicates with the Internet 36 through the base station controller 75 and the foreign network 40. When communicating on the foreign network 40, the mobile node 64 is assigned a specific IP address. The mobile node 64, however, may roam around the wireless network shown in FIG. 1. In so doing, the mobile node 64 may leave the cellular site 65 and enter the cellular site 68. When such movement occurs, the wireless connection 66 will terminate, and a new wireless connection between mobile node 64 and base station 73 will be initiated. This movement and the reconnection on the wireless network is called a wireless transition.

After a wireless transition occurs, the AAA servers in the foreign network 40 will receive control messages that will cause the deallocation of the IP address assigned to the mobile node 64. The mobile node 64, however, will need to maintain the same IP address if it wants to maintain consistent connectivity with the outside networks on the Internet 36. If a deallocation of the IP address occurs, information packets addressed to the mobile node 64 may be lost or misdirected. Further, accounting errors may occur based upon the deallocation and reallocation of the former IP address to another mobile node. The present invention solves the premature deallocation problem with a new message format and protocol for use with AAA servers.

Figure 2:
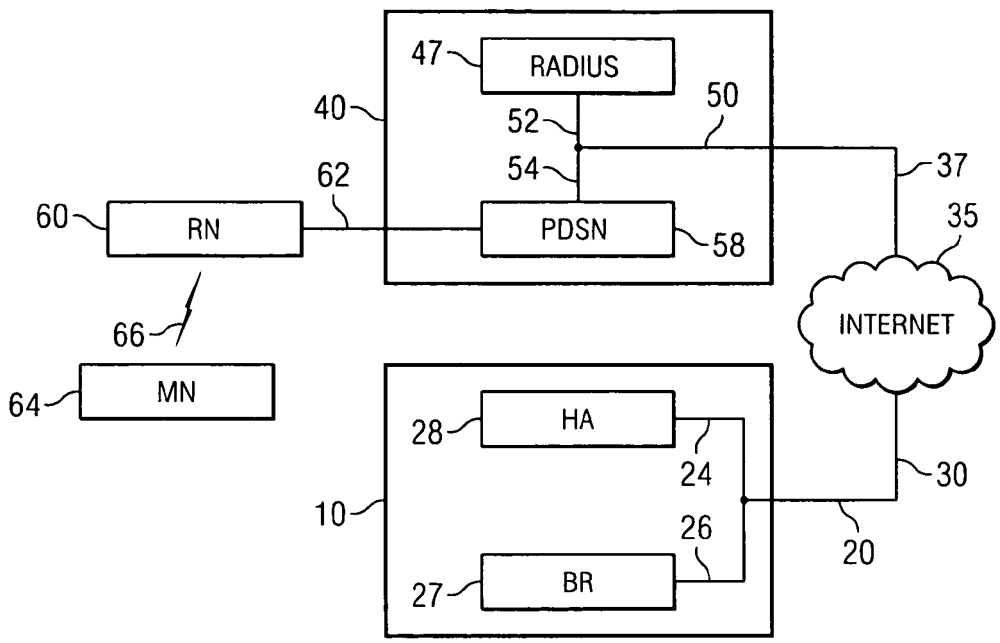
FIG. 2 is a schematic diagram of a mobile IP wireless communications network.

FIG. 2 shows a diagram of a wireless IP mobility network having the mobile node 64, a foreign network 40, a home network 10, and the Internet 35. The mobile node 64 is linked to a radio network (RN) 60 by a wireless communication link 66. The RN 60 is linked to the foreign network 40 via communication link 62, sometimes called the R-P interface. The foreign network 40 has a foreign agent, also referred to as a Packet Data Serving Node (PDSN) 58.

PDSN 58 is coupled to RN 60 via communication link 62. PDSN 58 is coupled to a foreign network buss line 50 by communication link 54. The foreign network 40 includes a AAA server, also referred to as a RADIUS server 47, which is coupled to buss line 50 via communication link 52. The foreign network 40 is coupled to the Internet 35 by communication link 37.

The home network 10 is coupled to the Internet 35 by communication link 30. The home network 10 has a central buss line 20 that is coupled to communication link 30. Home network 10 has a AAA server 27 coupled to buss line 20 by communication link 26. Home agent 28 is linked to the central buss line 20 by communication link 24.

Figure 3:
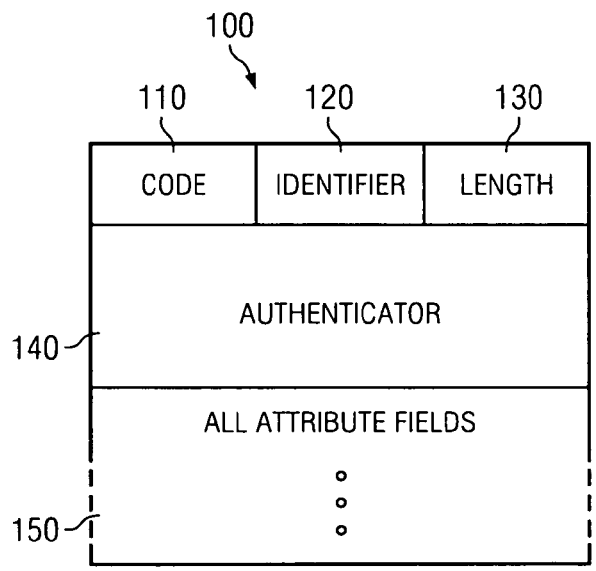
FIG. 3 is a general format for a UDP datagram.

The communication protocol used by the IP mobility system shown on FIGS. 1 and 2 uses a User Datagram Protocol ("UDP") with the IP standard. As shown in FIG. 3, a standard UDP datagram for an accounting message format 100 is used in the present invention, and message 100 includes a code field 110 of one byte in length. The code 110 identifies the type of RADIUS packet as an accounting message, either request or response. For an Accounting Request message the code 110 will have a value of 4, and for an Accounting Response message the code 110 will have a value of 5.

The accounting message format 100 also has an identifier data field 120 of one byte in length. The identifier data 120 is used to assist with the identification of corresponding accounting requests and responses. The accounting message format has a length field 130 of two bytes in length to indicate the length of the entire accounting message 100 including the code 110, identifier 120, length 130, authenticator 140, and all attribute fields 150.

The message format 100 includes an authenticator field 140 that is 16 bytes in length. The authenticator field 140 is used to authenticate the message between the PDSN 58 and the AAA RADIUS server 47. The attribute field 150 of accounting message 100 is variable in length and contains messages involved with the authentication, authorization, and accounting operations for the mobile node's 64 connectivity to foreign network 40 and other networks.

Figure 4:
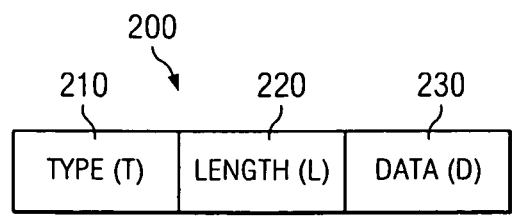
FIG. 4 is a general format for an attribute in a UDP datagram.

In message format 100, the format for the attribute field 150 is shown in FIG. 4. The three data structures in the attribute field 150 include the type field 210 (designated by "T") which occupies the first 8 bits of the attribute field 150, the length field 220 (designated by "L") which occupies the next 8 bits of the attribute field 150, and the data field 230 (designated by "D") which occupies the remaining bits in the attribute field 150. The type field 210 indicates the particular type of attribute in the attribute field 150, and the length field 220 indicates the length in bytes of the attribute field 150. The data field 230 may be zero or more bytes in length, and sets forth the applicable data that is being transmitted.

Figure 5:
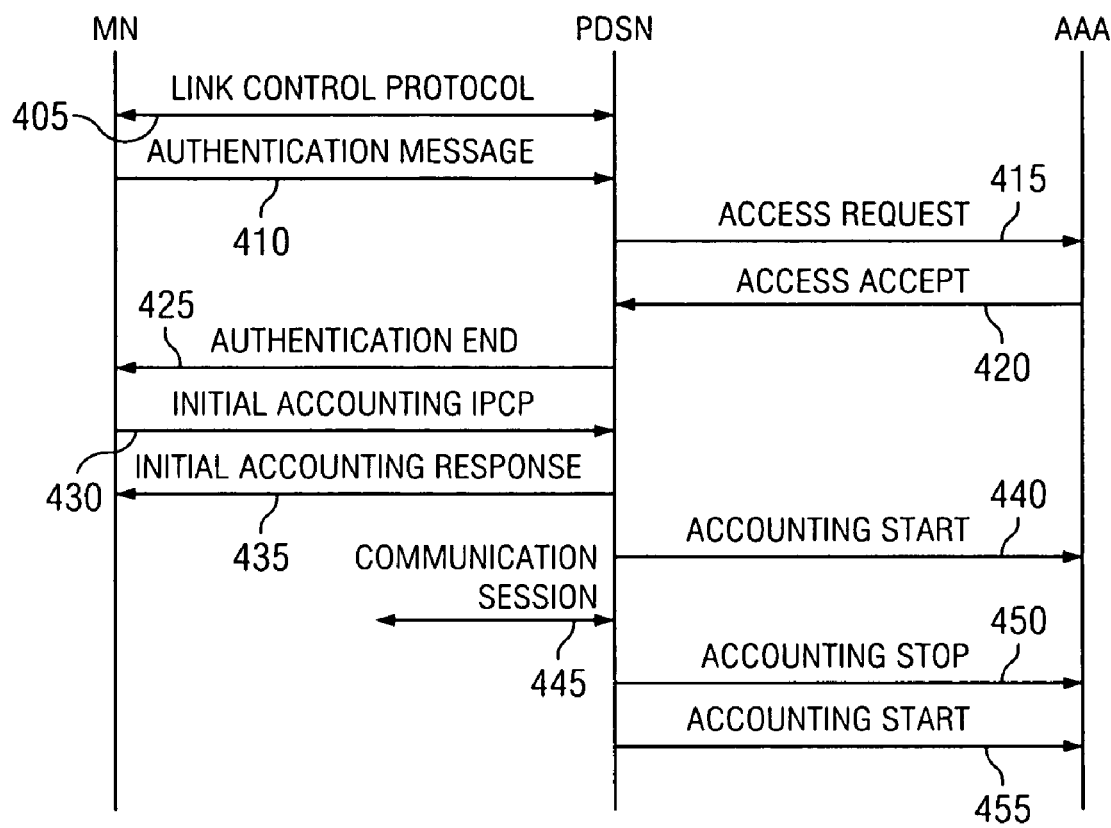
FIG. 5 is a step diagram for the authentication and accounting functions on a foreign network.

In a communication session involving the mobile node 64 on the foreign network 40, the mobile node 64 initiates a packet data session by contacting the RN 60 over communication link 66. The RN 60 in turn establishes communication with PDSN 58 over communication link 62. As shown in FIG. 5, the first communication from the mobile node 64 to the PDSN 58 is a Link Control protocol negotiation message at step 405. The negotiation message at step 405 establishes an R-P Interface 62 between the PDSN 58 and the RN 60.

After the contact is established between the mobile node 64 and the PDSN 58, it is necessary to authenticate the identity of the mobile node 64. The mobile node 64 sends an authentication message with a user-name to the PDSN 58 at step 410. The PDSN 58 then sends an Access Request message with the user name to the RADIUS server 47 at step 415. The Access Request message at step 415 contains information about the mobile node 64 including information such as a user password, destination port, client ID. Other information may be provided in the Access Request message.

The RADIUS server 47 processes the information in the Access Request message to determine if the mobile node 64 is authorized to access the network 40. If the mobile node 64 is authorized, the RADIUS server 47 generates an Access Accept message. The Access Accept message is transmitted to the PDSN 58 at step 420.

The RADIUS server 47 maintains a pool of dynamic IP addresses for assignment to mobile nodes on the foreign network 40. The IP addresses are used to route information packets to the Mobile Node 64 and accomplish AAA functions. This pooling of IP addresses is managed at the RADIUS server 47. This allocation of an IP address by the RADIUS server 47 occurs when the Access Accept message is generated and sent to the PDSN 58 at step 420. The PDSN 58 will use the IP address to locate the mobile node 64 on the RN 60 and direct information packets to the appropriate base stations on the RN 60 for communication with the mobile node 64.

In response to the Access Accept message, the PDSN 58 generates an Authentication End message that is transmitted to the Mobile Node 64 at step 425. If the mobile node 64 is not authorized by the RADIUS server 47, an Access Reject message is transmitted to the PDSN 58 to terminate the attempted communication with the mobile node 64.

Once the Mobile Node 64 is successfully linked to the home network 10 and the data packet communication session can begin, the RADIUS server 47 will begin accounting for the mobile node's usage of the foreign network 40 resources. The mobile node 64 sends an initial accounting message IPCP to the PDSN 58 at step 430. The PDSN 58 responds to the mobile node 64 with a response at step 435. The PDSN 58 will generate and transmit an Accounting Start message to the RADIUS server 47 to start the accounting functions. The PDSN 58 transmits the Accounting Start message to the RADIUS server 47 at step 440.

This will complete the setup for the accounting process for the packet data communication session. The remaining communication session tasks and linkages are accomplished by the PDSN 58 establishing a connection over the Internet 35 with the Home Network 10. The communication session takes place at step 445 by the interactions between the mobile node 64 and the PDSN 58, and any other networks.

At the end of the communication session, the PDSN 58 is notified of the communication termination and transmits an Accounting Stop message from the PDSN 58 to the RADIUS server 47. The Accounting Stop message is transmitted at step 450. In response to the Accounting Stop message at step 450, the mobile node's IP Address is deallocated back into the pool for subsequent allocation to another mobile node.

A problem can arise when certain mobility events occur, such as the handoff of control over the mobile node's wireless communication from one base station to another. When such a mobility event occurs, the PDSN 58 may transmit an Accounting Stop message to the RADIUS server 47 at step 450 followed by an Accounting Start message to the RADIUS server at step 455. The combination of the Accounting Stop message at step 450 and the Accounting Start message at step 455 is meant to indicate that the mobile user is continuing the communication in a multipart communication session.

As part of a multipart communication session, the mobile node's IP address should not be deallocated. The RADIUS server 47, however, may still deallocate the mobile node's IP address in response to the Accounting Stop message at step 450 before it has an opportunity to consider the Accounting Start message at step 455. Such a deallocation could cause an erroneous assignment of the same IP address to another mobile node. This erroneous assignment could disrupt proper communications and the accounting function for the mobile node.

Figure 6:
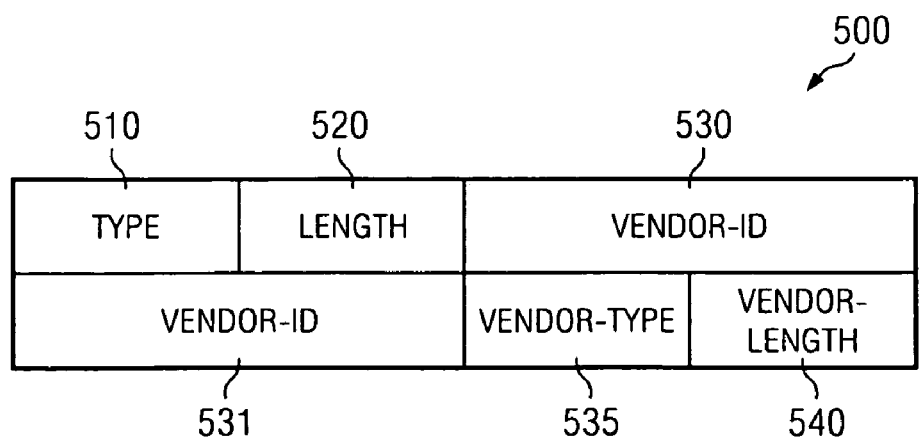
FIG. 6 is a new message format for an attribute to an Accounting Stop.

The present invention solves the premature deallocation problem by attaching a new message attribute 150 to the Accounting Stop message transmitted to the RADIUS server 47 at step 450. The new attribute 150 is called a Continuation Session Attribute, and its format is shown at 500 in FIG. 6. The type field 510 in Continuation Session Attribute 500 is assigned a value of 26 for Vendor-Specific for all attributes. The Length field 520 in attribute 500 is the length of all the data fields (in bytes) in the attribute.

The Vendor-ID field 530 is the same for all attributes, and in this context, the Vendor-ID is assigned a value of 5535. This Vendor-ID field also occupies the field 531 of attribute 500. The Vendor-Type field 535 specifies the vendor specific type of attribute and is 8 bits in length. The Vendor-Length field 540 is the length in bytes of the vendor identification fields. An Accounting Stop message with this Session Continue Attribute and the following Accounting Start message must have the same ID value in the Identifier field.

When an Accounting Stop message is received by the RADIUS server 47 at step 450, the Continuation Session Attribute 500 attached thereto will indicate to the RADIUS server 47 that the Accounting Stop message is not the end of the communication session, but the Accounting Stop message will be followed by an Accounting Start message that will continue the communication session. This attribute 500 will instruct the RADIUS server 47 not to deallocate the mobile node's IP address, and as such, the multipart communication session will not be erroneously interrupted by a premature deallocation of the IP address. When the Accounting Start message containing the correlating Identifier is then received by the RADIUS server 47, the accounting process for the communication session of mobile node 64 will continue without interruption or error.

While the invention has been particularly shown and described with respect to preferred embodiments, it will be readily understood that minor changes in the details of the invention may be made without departing from the spirit of the invention. Having described the invention, we claim:

The invention claimed is:

1. A communications system, comprising:
    a radio network coupled to a serving computer on a first network;
    a mobile node coupled to the radio network by a wireless communication link with an established communication session on the first network;
    a communication server computer linked to the serving computer, said communication server computer controlling the allocation of addresses for the mobile node and performing accounting functions for the first network, and;
    a control message transmission on the first network comprising a data element that denotes the continuation of the mobile node's communication session on the first network to prevent deallocation of a mobile node address and continue a multipart communication session.

2. The communications system in claim 1 wherein the control message includes a type field.

3. The communications system in claim 1 wherein the control message includes a length field.

4. The communications system in claim 1 wherein the control message includes a vendor-type field.

5. The communications system in claim 1 wherein the control message includes a field containing the data element.

6. The communications system in claim 1 wherein the serving computer is coupled to an Internet.

7. The communications system in claim 1 wherein the serving computer is coupled to a second network.

8. The communication system in claim 1 wherein the communication server computer will not change the mobile node's address on a foreign network after receiving the control message.

9. The method of continuing a communication session on a communication system comprising the steps of:
    transmitting a control message from a serving computer to a first serving computer, said control message contains a session continuation message; and
    receiving the control message from said serving computer and maintaining an address allocation for a mobile node on a foreign network, said control message causing a multipart communication session to continue by preventing deallocation of the address for the mobile node.

10. The method of continuing a communication session in claim 9 wherein the session continuation message is a data element in an accounting message.

11. The method of continuing a communication session in claim 9 wherein the serving computer continues accounting functions for the ongoing multipart communication session in response to the control message.

12. The method of continuing a communication session in claim 9 wherein the session continuation message includes a type data element.

13. The method of continuing a communication session in claim 9 wherein the session continuation message includes a length data element.

14. The method of continuing a communication session in claim 9 wherein the session continuation message includes a vendor-type data element.

15. The method of continuing a communication session in claim 9 wherein the session continuation message includes an identifier data element.

16. The method of continuing a communication session in claim 9 wherein the session continuation message includes a session continuation attribute data element.

17. The method of continuing a communication session in claim 16 wherein the session continuation attribute is a data value in an accounting message.

18. A method for supporting communications on packet-based network comprising the steps of:
    receiving a continuation session attribute, and,
    continuing an accounting function for a mobile node address on an ongoing communication session after receipt of the continuation session attribute in a message transmission by preventing deallocation of the mobile node address and allowing the communication session to remain ongoing.

19. The method for supporting communications of claim 18 wherein the continuation session message includes a type data element.

20. The method for supporting communications of claim 18 wherein the continuation session message includes a length data element.

21. The method for supporting communications of claim 18 wherein the continuation session message includes a vendor-type data element.

22. The method for supporting communications of claim 18 wherein the continuation session message includes an identifier data element.

23. The method for supporting communications of claim 18 wherein the continuation session message includes a session continuation attribute data element.

* * * * *